(12) United States Patent
Reinwald et al.

(10) Patent No.: US 10,626,795 B2
(45) Date of Patent: Apr. 21, 2020

(54) BEARING ASSEMBLY FOR A TURBOCHARGER, COMPRISING AN ANTI-ROTATION ELEMENT

(71) Applicant: Schaeffler Technologies AG & Co. KG, Herzogenaurach (DE)

(72) Inventors: Carina Reinwald, Altendorf (DE); Norbert Geyer, Hochstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 160 days.

(21) Appl. No.: 15/775,152

(22) PCT Filed: Oct. 19, 2016

(86) PCT No.: PCT/DE2016/200479
§ 371 (c)(1),
(2) Date: May 10, 2018

(87) PCT Pub. No.: WO2017/097294
PCT Pub. Date: Jun. 15, 2017

(65) Prior Publication Data
US 2018/0320593 A1    Nov. 8, 2018

(30) Foreign Application Priority Data
Dec. 10, 2015  (DE) .................. 10 2015 224 870

(51) Int. Cl.
*F16C 33/60*    (2006.01)
*F02C 7/06*    (2006.01)
(Continued)

(52) U.S. Cl.
CPC .................. *F02C 7/06* (2013.01); *F02C 6/12* (2013.01); *F16C 19/16* (2013.01); *F16C 19/184* (2013.01);
(Continued)

(58) Field of Classification Search
CPC .... F16C 19/184; F16C 19/548; F16C 19/557; F16C 35/067; F16C 2360/24; F05D 2240/50; F05D 2260/30
See application file for complete search history.

(56) References Cited

U.S. PATENT DOCUMENTS 8,496,452 B2 *   7/2013   Marsal .................. F01D 25/162
                                                                  384/906
8,888,447 B2    11/2014   House et al.
(Continued)

FOREIGN PATENT DOCUMENTS

| CN | 102639839 | 8/2012 |
| CN | 102884329 | 1/2013 |

(Continued)

*Primary Examiner* — Phillip A Johnson
(74) *Attorney, Agent, or Firm* — Volpe and Koenig, P.C.

(57) ABSTRACT

A bearing assembly for a compressor of an internal combustion engine. The bearing assembly includes an outer ring having an outer cylindrical surface with a first and a second axial section. A positioning component which has a recess with an inner circumference is provided, wherein the positioning component surrounds the outer ring in a region of the second axial section and the positioning component and the outer ring are arranged displaceably relative to one another. To provide an alternative anti-rotation element and an alternative axial stop, at least one sub-section of an inner circumference of the recess of the positioning component is non-uniformly spaced from the center point and the cross-section of the second axial section around the circumference has at least one sub-section with a radius that varies around the contour of the outer cylindrical surface (radius variation). In a first circumferential section, the distance between the contour of the outer cylindrical surface of the second axial section and the axis of rotation is greater than the distance between the contour of the inner circumference of (Continued)

the recess of the positioning component and the axis of rotation in a second circumferential section.

17 Claims, 3 Drawing Sheets

(51) Int. Cl.
  *F02C 6/12* (2006.01)
  *F16C 19/18* (2006.01)
  *F16C 27/04* (2006.01)
  *F16C 19/16* (2006.01)
  *F16C 35/067* (2006.01)

(52) U.S. Cl.
  CPC ........ *F16C 27/045* (2013.01); *F05D 2220/40* (2013.01); *F05D 2240/50* (2013.01); *F05D 2260/30* (2013.01); *F16C 35/067* (2013.01); *F16C 2360/24* (2013.01)

(56) References Cited

U.S. PATENT DOCUMENTS

| | | | |
|---|---|---|---|
| 8,985,857 B2 | 3/2015 | Schmidt et al. | |
| 9,261,105 B2* | 2/2016 | Schmidt | ................ F16C 19/184 |
| 9,932,896 B2 | 4/2018 | Lischer | |
| 10,132,350 B2* | 11/2018 | Schmidt | ................ F16C 35/067 |
| 2013/0028732 A1 | 1/2013 | Golovatai-Schmidt et al. | |
| 2014/0069094 A1* | 3/2014 | Marsal | ................ F01D 25/162 |
| | | | 60/598 |

FOREIGN PATENT DOCUMENTS

| | | |
|---|---|---|
| CN | 103261721 | 8/2013 |
| CN | 103477099 | 12/2013 |
| DE | 102013224280 | 5/2015 |
| EP | 2299066 | 3/2011 |
| WO | 2014004240 | 1/2014 |

\* cited by examiner

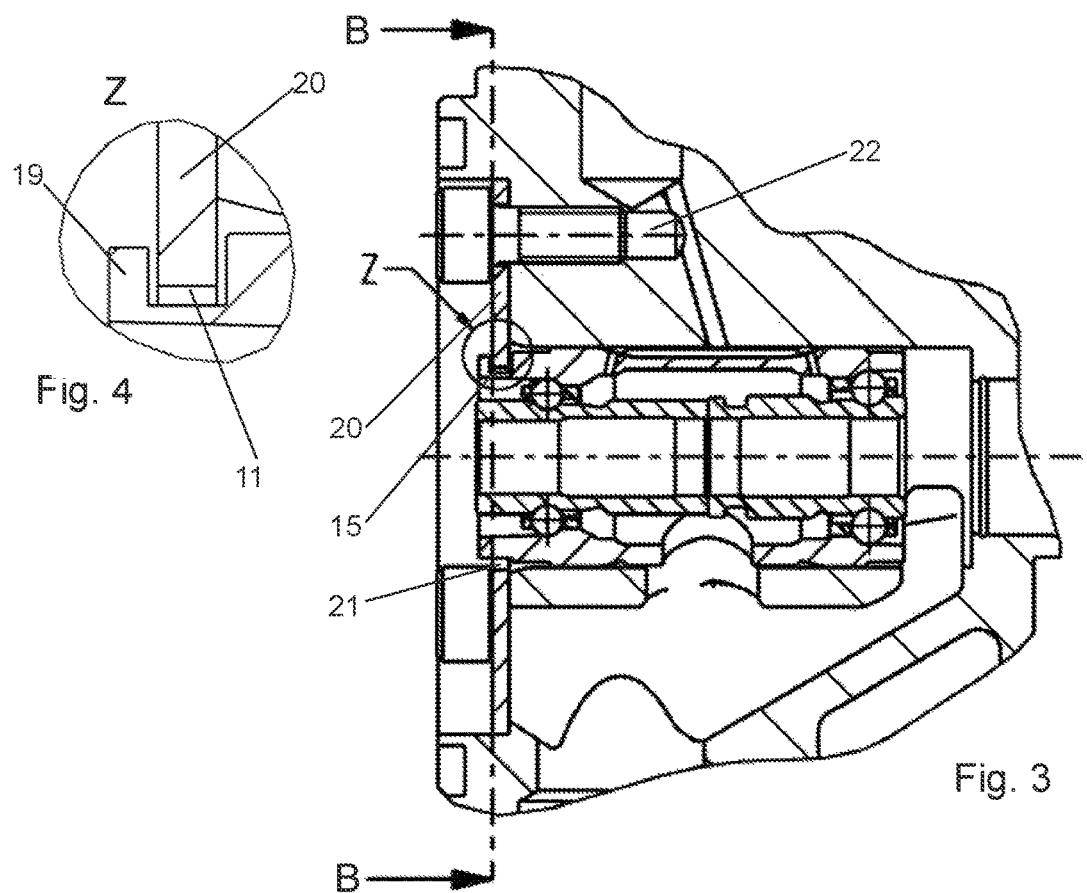
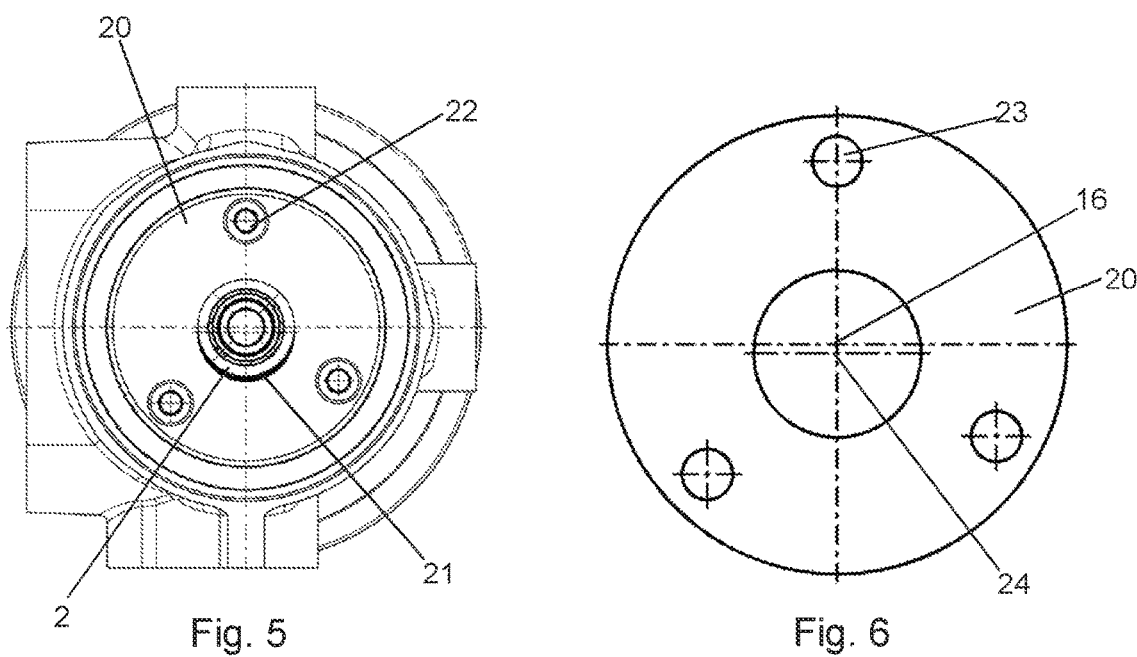

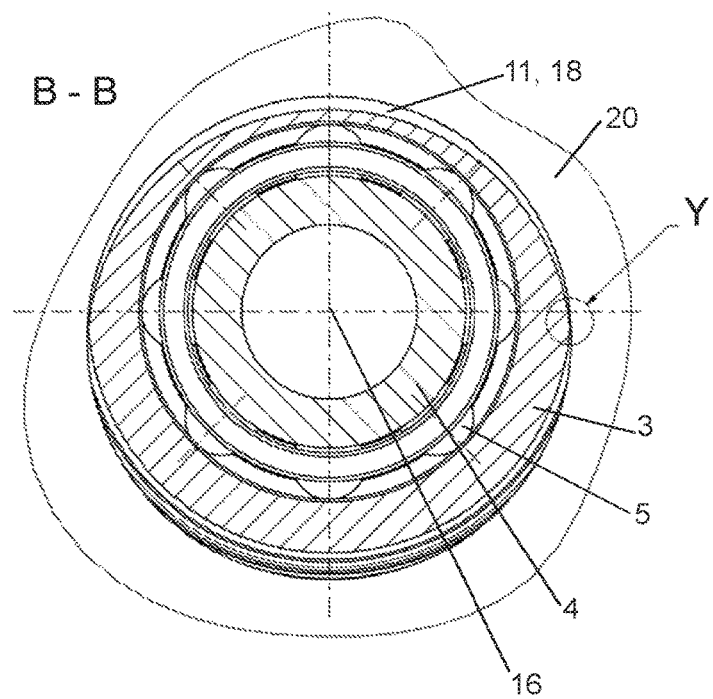
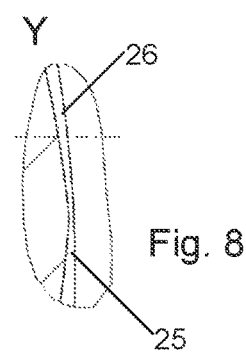
Fig. 7
Fig. 8
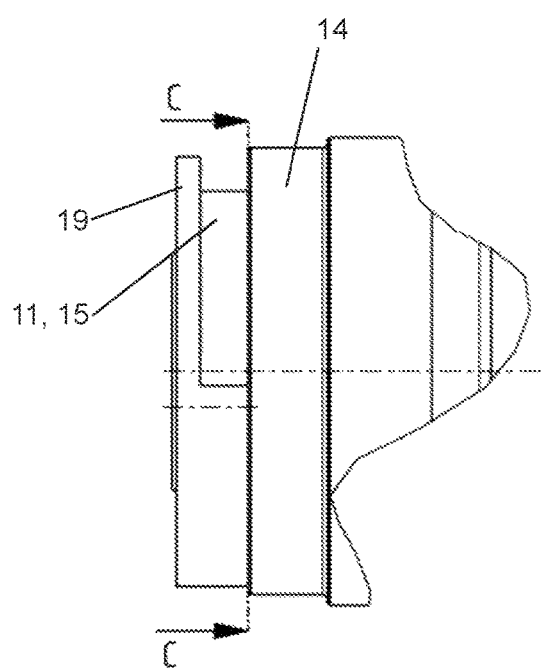
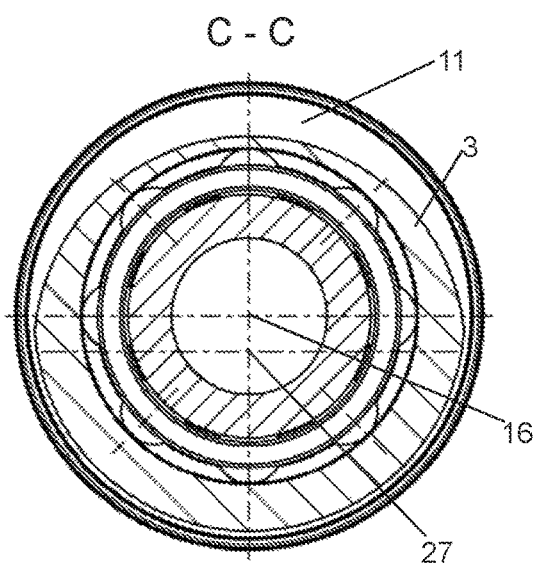
Fig. 9
Fig. 10

BEARING ASSEMBLY FOR A TURBOCHARGER, COMPRISING AN ANTI-ROTATION ELEMENT

BACKGROUND

The invention relates to a bearing assembly for a compressor of an internal combustion engine, in particular, a bearing assembly including an angular contact ball bearing for supporting and guiding the rotor shaft of a turbocharger. Ball bearings include balls as roller bodies and an outer ring and, if necessary, an inner ring, on each of which a raceway is formed. The balls roll between the outer ring and the inner ring on the raceways and are spaced apart from each other by a cage with roller body pockets distributed around its periphery. The cage can be guided on the roller bodies or on one of the rings; in turbochargers, the guidance usually takes place on the outer ring—but it is also possible for the guidance to take place on the inner ring. The special operating conditions of a turbocharger are particular challenges when designing the bearing. The rotor shaft rotates at a rotational speed that transfers high loads into the bearing as a function of the absolute magnitude and oscillations. Turbochargers are operated at continuously changing rotational speeds that can equal at a maximum up to 300,000 revolutions per minute. In addition, high operating temperatures that act on the lubricant and the materials in use prevail, in particular, in the vicinity of the turbine wheel. Comparable operating conditions also apply to bearings for rotor shafts for compressors and so-called turbo compounds.

Typically, a rotational lock of the roller bearing cartridge is implemented by contact surfaces that are formed on a housing and the bearing outer ring. The axial locking is typically realized by a stop on the outer ends of the outer bearing sleeve. In such variants, the support in the axial direction is realized at two different positions on the housing. This involves increasing the axial play for heating the components due to different coefficients of thermal expansion. The housing can be made, namely from lightweight metal, such as aluminum or an aluminum alloy, while the bearing sleeves are made, in particular, from steel or a steel alloy.

EP 2 299 066 A1 shows, as an example, a bearing assembly for a compressor of an internal combustion engine. Shown is a bearing assembly with an outer ring of a bearing cartridge and with a positioning component that is mounted on a housing and contacts the end surface of the outer ring. The positioning component has a central cut-out with an inner periphery. In the area of the contact surface between the positioning component and outer ring, there are two pins. The pins engage in corresponding cut-outs on the outer ring and form the rotational lock. The contact area between the positioning component and outer ring forms a one-sided axial bearing. In some applications, it has proven disadvantageous that the fit in the area of the rotational lock and the axial stop must be designed as a clearance fit with large minimum play due to the heat-related expansion of adjacent components. In some applications, this can generate noise.

SUMMARY

Therefore, the object of the invention is to provide a bearing assembly, a compressor with such a bearing assembly, and a turbocharger with such a bearing assembly, whose rotational lock is improved.

The solution to this objective is produced using one or more features of the invention, advantageous refinements, and constructions of the invention can be obtained from the description and claims that follow. Accordingly, the objective is achieved by a bearing assembly for a compressor of an internal combustion engine with an outer ring having an outer lateral surface with a first and a second axial section, wherein the cross section of the first axial section has an essentially constant radius of the contour of the outer lateral surface, wherein a center point on an axis of rotation is defined and with a positioning component that has a cut-out with an inner periphery, wherein the positioning component surrounds the outer ring in the area of the second axial section and wherein the positioning component and the outer ring are arranged so that they can move relative to each other. The inner periphery of the cut-out of the positioning component has at least one sub-section with non-uniform distance to the center point and the cross section of the second axial section has, along the periphery, at least one sub-section that has a changing radius of the contour of the outer lateral surface (radius variation), wherein in a first peripheral section, the distance between the contour of the outer lateral surface of the second axial section and the axis of rotation is greater than the distance between the contour of the inner periphery and the axis of rotation in a second peripheral section.

The invention is based on the knowledge that an arrangement of the positioning component relative to the outer ring can be realized such that the distance between the center point on the axis of rotation of the outer ring and the inner periphery of the cut-out of the positioning component changes along the inner periphery. The outer lateral surface of the second axial section of the outer ring acts as the mating piece. The cross section of the second axial section has, along the periphery, at least one sub-section that has a changing radius of the contour of the outer lateral surface. The inner periphery of the cut-out of the positioning component and the outer lateral surface of the second axial section thus can be set in a defined relationship to each other: in a first peripheral section, the distance between the contour of the outer lateral surface of the second axial section and the axis of rotation is greater than the distance between the contour of the inner periphery and the axis of rotation in a second peripheral section, wherein the expression peripheral section designates an angular range of the inner periphery of the positioning component and an angular range of the contour of the outer lateral surface.

Due to the geometrical relationships, rotation of the outer ring can be prevented, wherein this results in tangential contact conditions between the outer ring and the positioning component. This produces advantages with respect to the production of noise and wear. In addition, a low axial and also radial play can be implemented with simultaneously only minimal requirements on the production tolerances.

In one advantageous embodiment, a third axial section with an outer lateral surface contacts the second axial section on the side facing away from the first section, wherein, in cross section, the contour of the outer lateral surface of the third axial section has a sub-section with a greater distance to the center point compared with the sub-section of the radius variation of the second axial section in the same peripheral angle area (axial bearing section). Thus, advantageously an axial bearing can be formed that is used, in particular, for the axial locking of the outer ring and the bearing cartridge. In addition, in an inexpensive way, a locking can be implemented that can absorb forces independent of the axial direction of effect of the forces.

In another advantageous embodiment, the positioning component can be connected to a housing, wherein the relative position of the first peripheral section and of the second peripheral section are defined. In this way, the components can be aligned easily. The positioning component has, in particular, a disk-shaped construction and is preferably connected by threaded connections to the housing. The threaded connections are preferably in an asymmetric arrangement, wherein the positionally accurate arrangement of the positioning component is guaranteed.

In another advantageous embodiment, in a third peripheral section, the distance between the contour of the outer lateral surface of the second axial section and the axis of rotation is greater than the distance between the contour of the inner periphery and the axis of rotation in the second and/or a fourth peripheral section. In this way, a rotational lock can be guaranteed, which acts in both peripheral directions. In addition, due to the arrangement of a fourth peripheral section, a second area can be formed so that rotation is prevented even for small angles of rotation.

In another advantageous embodiment, the radius variation is a circular arc-shaped sub-section, whose center point is on a second axis (second center point), whose position deviates from the axis of rotation. The second center point advantageously encloses, with the circular arc-shaped sub-section, the center point on the axis of rotation of the outer ring.

In another advantageous embodiment, the cut-out has essentially a circular shape, wherein the radius of the circular cut-out is greater than or equal to the minimum radius of the contour of the cross section of the outer lateral surface of the second axial section and is less than the largest radius of the contour of the cross section of the outer lateral surface of the second axial section. In this way it can be guaranteed that rotation of the bearing outer ring is prevented even for small angles of rotation.

In one advantageous refinement of this embodiment, the center point of the circular cut-out (third center point) is arranged eccentric to the center point, wherein the center point is closer to the sub-section of the distance variation than the third center point.

In another advantageous embodiment, the radius variation of the second axial section is produced from an eccentric recess. In particular, the second and third axial section can have essentially the same base body. Thus, the contour of the second axial section can be realized economically.

The objective is further achieved by a compressor for an internal combustion engine with a housing and with a bearing assembly in one of the described embodiments, wherein the positioning component is fixed on the housing.

In addition, the object is achieved by a turbocharger for an internal combustion engine with a turbine wheel and a compressor wheel that are connected to each other by a shaft, as well as with a bearing assembly according to one of the embodiments described above, wherein the bearing assembly is held at least partially by a housing. In addition, an application is possible, in principle, with a turbo compressor, a turbo compound, and comparable applications, for example, a compressor driven by an electric motor.

BRIEF DESCRIPTION OF THE DRAWINGS

The invention is now explained in more detail using an embodiment, wherein reference is made to the drawings. Functionally identical elements of the explained embodiments are marked with identical reference symbols.

DETAILED DESCRIPTION

Figure 1:
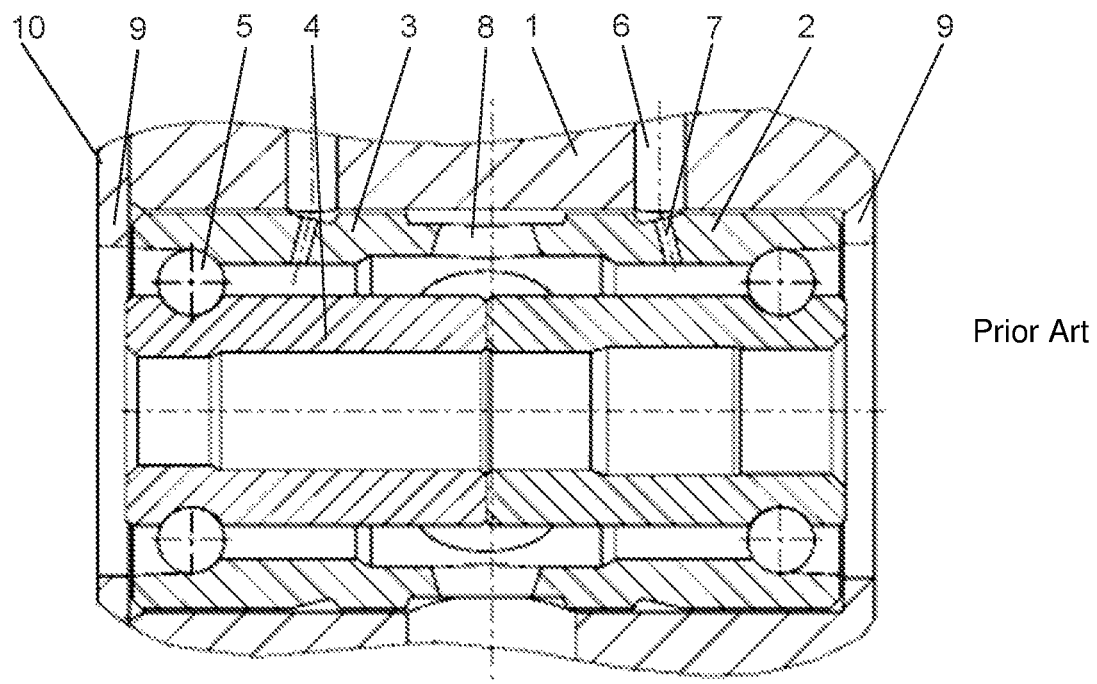
FIG. 1 central housing of a turbocharger with bearing cartridge according to the prior art, FIG. 2 perspective view of a bearing cartridge with eccentric recess, FIG. 3 longitudinal section of a central housing with bearing cartridge of FIG. 2, FIG. 4 detail Z from FIG. 3, FIG. 5 top view of the end side of the bearing cartridge from FIG. 3, FIG. 6 positioning component in top view, FIG. 7 bearing cartridge of FIG. 3 in cross section B-B, FIG. 8 detail Y from FIG. 7, FIG. 9 bearing cartridge with eccentric recess, and FIG. 10 bearing cartridge of FIG. 9 in cross section C-C.

FIG. 1 shows a cut-out of a central housing 1, which forms a turbocharger together with a bearing cartridge 2, a shaft (not shown), and turbine and compressor wheel (not shown) mounted on the shaft on the end. The bearing cartridge 2 held by the central housing 1 comprises a two-row angular contact ball bearing assembly with a continuous outer ring 3, a divided inner ring 4, and balls 5 as roller bodies. The lubrication of the bearing is realized by motor oil that can be supplied to the bearing cartridge 2 via a motor oil hole 6. By a splash oil hole 7, the motor oil enters into the interior of the bearing cartridge 2. The discharge is realized via outlet openings 8.

On both sides of the bearing cartridge 2 there is an axial stop 9 arranged on a central housing 1, wherein the axial stop 9 is formed on one of the ends by a cover 10 that can be screwed on the central housing 1. A lock against rotation can be realized, for example, by a pin engaging in the cartridge in the radial direction (not shown). In some applications it has proven disadvantageous that the fit in the area of the rotational lock and the axial stop must be designed as a clearance fit with large minimum play due to heat-related expansion of adjacent components. In some applications, this can lead to the development of noise.

Figure 2:
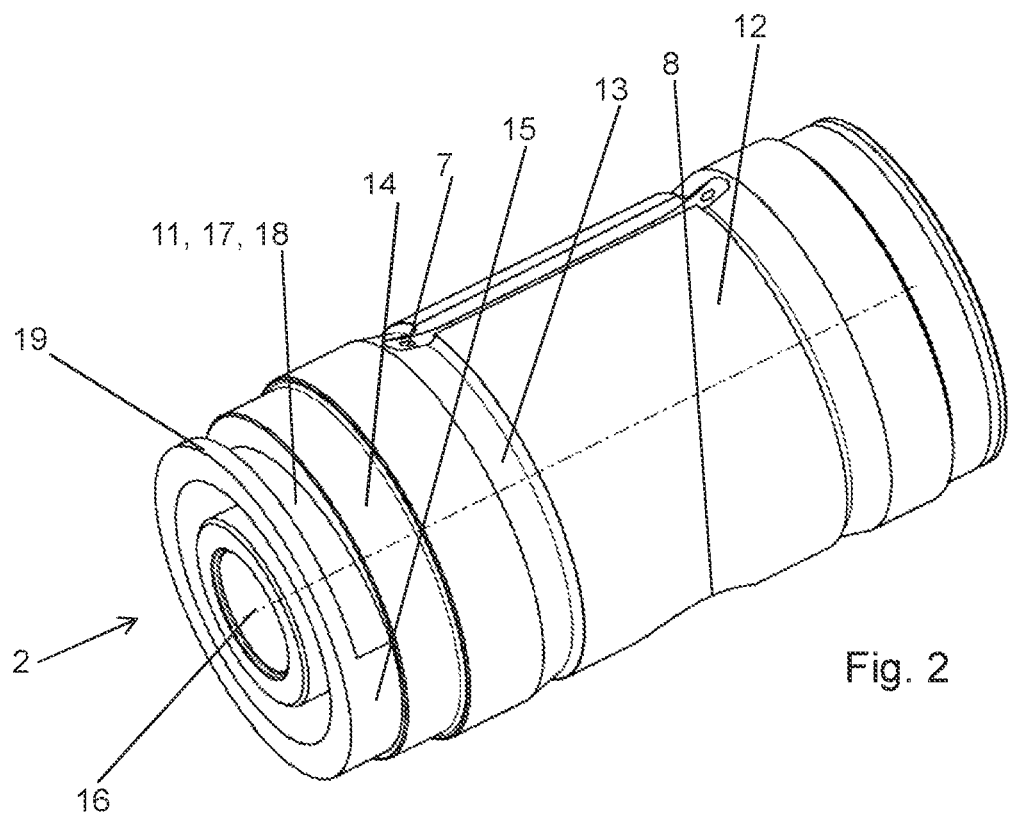

A bearing cartridge 2 according to the invention with eccentric recess 11 is shown in a perspective illustration in FIG. 2. A peripheral groove 13 that is used for feeding motor oil from the motor oil hole 6 of the central housing 1 to the splash oil hole 7 connects to an axial middle segment 12 of the shown outer ring 3, on whose periphery an outlet opening 8 is indicated. On the end, a shape of the outer lateral surface is shown with a first and a second axial section (14 and 15), wherein the cross section of the first axial section 14 has an essentially constant radius of the contour of the outer lateral surface, wherein a center point 16 is defined on an axis of rotation.

The cross section of the second axial section 15 has, along the periphery, at least one sub-section that has a changing radius of the contour of the outer lateral surface. This profile of the contour defined below as radius variation 18 projects from an eccentric recess 11. A third axial section 19 with an outer lateral surface connects to the second axial section 15 on the side facing away from the first axial section 14, wherein, in cross section, the contour of the outer lateral surface of the third axial section 19 has a sub-section with a greater distance to the center point 16 compared to the sub-section of the radius variation of the second axial section in the same peripheral angle area. In this way, an axial stop and a rotational lock can be formed, whose function emerges from FIG. 3.

FIG. 3 shows a longitudinal section of a central housing 1 with the bearing cartridge 2 shown in FIG. 2. In addition to the general components of a bearing cartridge 2 according to the class already described in FIG. 1, there is a positioning component 20, which has a cut-out 21 with an inner periphery, wherein the positioning component 20 surrounds the outer ring 3 in the area of the second axial section 15 and wherein the positioning component 20 and the outer ring 3 are arranged so that they can move relative to each other. The positioning component 20 is constructed as a disk and connected rigidly to the central housing 1 by a threaded connection 22.

FIG. 4 shows the detail Z of the bearing cartridge 2 from FIG. 3. The positioning component 20 engages in the groove formed by the recess 11 and limits the axial movement of the bearing cartridge 2 in the axial direction. The axial lock is thus realized in contrast to the bearing cartridge known from the prior art on only one side, wherein the negative effects of a temperature-dependent expansion of the materials can be reduced.

FIG. 5 shows an end side of the central housing 1 with bearing cartridge 2 in top view. The positioning component 20 in the form of a disk is mounted by a threaded connection 22 on the central housing 1. A middle cut-out 21 engages in the area of the radius variation 18 in the recess 11. In the mounted state, the inner periphery of the recess 21 of the positioning component 20 has a sub-section with non-uniform distance to the center point 16 defined by the axis of rotation of the bearing cartridge.

FIG. 6 shows the positioning component in top view. Three holes 23 allow a threaded connection 22 between the positioning component 20 and central housing 1, wherein an asymmetric hole pattern is used. In this way, an aligned assembly is enabled.

The cut-out 21 has essentially a circular shape, wherein the radius of the circular cut-out 21 is greater than or equal to the minimum radius of the contour of the cross section of the outer lateral surface of the second axial section 15 and smaller than the largest radius of the contour of the cross section of the outer lateral surface of the second axial section 15. The center point of the circular recess 21 (third center point 24) is arranged eccentric to the center point 16, wherein the center point 16 is closer to the sub-section of the radius variation 18 in the mounted state than the third center point 24. In this way it is guaranteed that the positioning component 20 engages in the recess 11 shown in FIG. 4.

FIG. 7 shows the bearing cartridge 2 of FIG. 3 in cross section B-B. Shown are the inner ring 4, the roller bodies 5, and the outer ring 3 in the area of the second axial section 15. Shown is, in particular, the contour of the radius variation 18. In addition, the interaction between recess 11 and positioning component 20 for implementing a rotational lock is shown: in a first peripheral section 25, the distance between the contour of the outer lateral surface of the second axial section 15 and the axis of rotation is greater than the distance between the contour of the inner periphery of the cut-out 21 of the positioning component 20 and the axis of rotation in a second peripheral section 26.

This relationship is shown in detail Y of FIG. 8: a rotation in the counterclockwise direction leads to contact between the outer ring 3 and positioning component 20 due to the described geometrical relationships, wherein further rotation is prevented. A corresponding shape on the opposing side prevents rotation in the clockwise direction: in a third peripheral section, the distance between the contour of the outer lateral surface of the second axial section 15 and the axis of rotation 16 is greater than the distance between the contour of the inner periphery and the axis of rotation in the second peripheral section 26. Thus, in both directions this results in tangential contact conditions, which has a positive effect on the wear behavior.

FIG. 9 shows another view of the bearing cartridge 2 with eccentric recess; FIG. 10 shows the bearing cartridge 2 in cross section C-C. Shown is the eccentricity of the recess 11, whose radius variation 18 leads to a shift relative to the center point 16: the radius variation 17 is, in the shown embodiment, a circular arc-shaped sub-section, whose center point is on a second axis (second center point 27), whose position deviates from the axis of rotation.

LIST OF REFERENCE SYMBOLS

1 Central housing
2 Bearing cartridge
3 Outer ring
4 Inner ring
5 Roller body
6 Motor oil hole
7 Splash oil hole
8 Outlet openings
9 Axial stop
10 Cover
11 Recess
12 Middle segment
13 Groove
14 First axial section
15 Second axial section
16 Center point on the axis of rotation
17 Sub-section
18 Radius variation
19 Third axial section
20 Positioning component
21 Cut-out
22 Threaded connection
23 Hole
24 Third center point
25 First circumferential section
26 Second circumferential section
27 Second center point

The invention claimed is:

1. A bearing assembly for a compressor of an internal combustion engine, the bearing assembly comprising
an outer ring having an outer lateral surface with a first axial section and a second axial section, a cross section of the first axial section has an essentially constant radius that defines a contour of an outer lateral surface thereof,
a center point defined on an axis of rotation,
a positioning component that has a cut-out with an inner periphery, said positioning component surrounds the outer ring in an area of the second axial section and the positioning component and the outer ring are arranged displaceably relative to each other,
an inner periphery of the cut-out of the positioning component has at least one sub-section with a non-uniform distance to the center point and a cross section of the second axial section has, along a periphery, at least one sub-section that has a changing radius that defines a radius variation of a contour of an outer lateral surface thereof, and, in a first peripheral section, a distance between the contour of the outer lateral surface of the second axial section and the axis of rotation is greater than a distance between a contour of the inner periphery of the cut-out of the positioning component and the axis of rotation in a second peripheral section.

2. The bearing assembly according to claim 1, wherein the outer ring includes a third axial section with an outer lateral surface contacts the second axial section on a side facing away from the first axial section, and, in cross section, a contour of the outer lateral surface of the third axial section has a sub-section with a greater distance to the center point compared with the sub-section of the radius variation of the second axial section in a same peripheral angle range.

3. The bearing assembly according to claim 1, wherein the positioning component is connectable to a housing, and a relative position of the first peripheral section and the second peripheral section are defined.

4. The bearing according to claim 1, wherein, in a third peripheral section, a distance between the contour of the outer lateral surface of the second axial section and the axis of rotation is greater than a distance between the contour of the inner periphery of the cut-out of the positioning component and the axis of rotation in at least one of the second peripheral section or a fourth peripheral section.

5. The bearing assembly according to claim 1, wherein the radius variation is a circular arc-shaped sub-section, having a center point that is on a second axis, whose position deviates from the axis of rotation.

6. The bearing assembly according to claim 1, wherein the cut-out is essentially circular, a radius of the cut-out is greater than or equal to a minimum radius of the contour of the cross section of the outer lateral surface of the second axial section and smaller than a largest radius of the contour of the cross section of the outer lateral surface of the second axial section.

7. The bearing assembly according to claim 6, wherein a center point of the circular cut-out is arranged eccentric to the center point, and the center point is closer to the sub-section of the radius variation than a third center point.

8. The bearing assembly according to claim 1, wherein the radius variation of the second axial section projects from an eccentric recess.

9. A compressor for an internal combustion engine comprising a housing and with a bearing assembly according to claim 1, wherein the positioning component is fixed on the housing.

10. A turbocharger for an internal combustion engine comprising a turbine wheel and a compressor wheel that are connected to each other by a shaft, and a bearing assembly according to claim 1, wherein the bearing assembly is held at least partially by a housing.

11. A bearing assembly for a compressor of an internal combustion engine, the bearing assembly comprising an outer ring having an outer lateral surface with a first axial section and a second axial section,
a center point defined on an axis of rotation,
a positioning component that has a cut-out with an inner periphery, the positioning component surrounds the outer ring in an area of the second axial section and the positioning component and the outer ring are arranged displaceably relative to each other,
an inner periphery of the cut-out of the positioning component has at least one sub-section with a non-uniform distance to the center point and a cross section of the second axial section has, along a periphery, at least one sub-section that has a changing radius that defines a radius variation at a contour of an outer lateral surface thereof, and in a first peripheral section, a distance between the contour of the outer lateral surface of the second axial section and the axis of rotation is greater than a distance between a contour of the inner periphery of the cut-out of the positioning component and the axis of rotation in a second peripheral section.

12. The bearing assembly according to claim 11, wherein a cross section of the first axial section has an essentially constant radius that defines a contour of an outer lateral surface thereof.

13. The bearing assembly according to claim 11, wherein the outer ring includes a third axial section with an outer lateral surface contacts the second axial section on a side facing away from the first axial section, and in cross section, a contour of the outer lateral surface of the third axial section has a sub-section with a greater distance to the center point compared with the sub-section of the radius variation of the second axial section in a same peripheral angle range.

14. The bearing assembly according to claim 11, wherein the radius variation is a circular arc-shaped sub-section.

15. The bearing assembly according to claim 11, wherein a radius of the cut-out is greater than or equal to a minimum radius of the contour of the cross section of the outer lateral surface of the second axial section.

16. The bearing assembly according to claim 15, wherein the radius of the cut-out is smaller than a largest radius of the contour of the cross section of the outer lateral surface of the second axial section.

17. The bearing assembly according to claim 11, wherein the radius variation of the second axial section defines an eccentric recess.

* * * * *